United States Patent
Loyens et al.

(10) Patent No.: US 7,363,593 B1
(45) Date of Patent: Apr. 22, 2008

(54) SYSTEM AND METHOD FOR PRESENTING INFORMATION ORGANIZED BY HIERARCHICAL LEVELS

(75) Inventors: Jon Loyens, Austin, TX (US); Tyler N. Klein, Pittsburgh, PA (US)

(73) Assignee: Versata Development Group, Inc., Austin, TX (US)

( * ) Notice: Subject to any disclaimer, the term of this patent is extended or adjusted under 35 U.S.C. 154(b) by 275 days.

(21) Appl. No.: 09/997,773

(22) Filed: Nov. 30, 2001

(51) Int. Cl.
*G06F 17/00* (2006.01)

(52) U.S. Cl. ............... 715/853; 715/854; 715/855; 715/712; 715/713; 707/100; 707/102; 707/103

(58) Field of Classification Search ........ 345/853–855, 345/762–763, 776–777, 783, 798, 800; 707/1, 707/100–103, 200, 3; 715/853–855, 509, 715/514, 526, 712–713, 227, 243, 204
See application file for complete search history.

(56) References Cited

U.S. PATENT DOCUMENTS

| | | | |
|---|---|---|---|
| 4,835,683 A | 5/1989 | Phillips et al. | 364/200 |
| 5,065,338 A | 11/1991 | Phillips et al. | 395/51 |
| 5,485,175 A * | 1/1996 | Suzuki | 345/841 |
| 5,504,850 A * | 4/1996 | Aoyama | 715/860 |
| 5,715,449 A * | 2/1998 | Peters et al. | 707/102 |
| 5,787,417 A * | 7/1998 | Hargrove | 707/4 |
| 6,148,311 A * | 11/2000 | Wishnie et al. | 715/513 |
| 6,161,130 A | 12/2000 | Horvitz et al. | 709/206 |
| 6,199,059 B1 * | 3/2001 | Dahan et al. | 707/3 |
| 6,212,526 B1 * | 4/2001 | Chaudhuri et al. | 707/102 |
| 6,230,151 B1 * | 5/2001 | Agrawal et al. | 706/12 |
| 6,233,575 B1 * | 5/2001 | Agrawal et al. | 707/6 |
| 6,236,400 B1 * | 5/2001 | Guerrero | 345/841 |
| 6,243,695 B1 * | 6/2001 | Assaleh et al. | 706/20 |
| 6,247,016 B1 * | 6/2001 | Rastogi et al. | 707/101 |
| 6,301,579 B1 * | 10/2001 | Becker | 707/102 |
| 6,332,163 B1 | 12/2001 | Bowman-Amuah | 709/231 |

(Continued)

OTHER PUBLICATIONS

Daniel Schwabe and Simone D. J. Barbosa "Navigation Modelling in Hypermedia Applications," Departamento de Informatica, Brazil, 1994.*

(Continued)

*Primary Examiner*—Tadesse Hailu
(74) *Attorney, Agent, or Firm*—Hamilton & Terrile, LLP; Kent B. Chambers

(57) ABSTRACT

A system and method for presenting information organized by hierarchy levels displays navigation bars related to the hierarchy of nodes from the root node to the one or more sub-nodes having the lowest hierarchy level and hides unrelated sub-nodes, such as siblings of ancestors of the lowest hierarchy level node. The relevant levels of the hierarchy are displayed as a stacked box metaphor to provide strong state information for information associated with a desired sub-node of the lowest selected hierarchy level. Index tabs provide a view of heterogeneous sections sliced across a desired attribute to provide rapid navigation through a hierarchy of non-homogeneous classifiers to find information having an indexed attribute. Activation of a sub-node navigation bar displays information associated with the sub-node or displays child nodes and hides sibling nodes of the activated sub-node. An activation icon associated with navigation bars allows a user to browse upwards in the hierarchy level as desired.

45 Claims, 3 Drawing Sheets

U.S. PATENT DOCUMENTS

| | | | |
|---|---|---|---|
| 6,393,427 B1 * | 5/2002 | Vu et al. | 707/101 |
| 6,433,797 B1 * | 8/2002 | Zellweger | 345/762 |
| 6,493,717 B1 * | 12/2002 | Junkin | 707/102 |
| 6,496,208 B1 * | 12/2002 | Bernhardt et al. | 715/853 |
| 6,606,620 B1 * | 8/2003 | Sundaresan et al. | 707/3 |
| 6,642,946 B1 * | 11/2003 | Janes et al. | 345/854 |
| 6,711,585 B1 * | 3/2004 | Copperman et al. | 707/104.1 |
| 6,732,109 B2 * | 5/2004 | Lindberg et al. | 707/101 |
| 6,801,916 B2 * | 10/2004 | Roberge et al. | 707/101 |
| 6,834,287 B1 * | 12/2004 | Folk-Williams et al. | 707/103 Z |
| 6,907,414 B1 | 6/2005 | Parnell | 706/47 |
| 2001/0037324 A1 * | 11/2001 | Agrawal et al. | 707/1 |
| 2001/0054049 A1 * | 12/2001 | Maeda et al. | 707/517 |
| 2002/0059210 A1 * | 5/2002 | Makus et al. | 707/3 |
| 2002/0107892 A1 * | 8/2002 | Chittu et al. | 707/514 |
| 2002/0111932 A1 * | 8/2002 | Roberge et al. | 707/1 |

OTHER PUBLICATIONS

IBM Technical Disclosure Bulletin, Tree Navigator—A concept for navigation in big trees, Issue No. 448, p. No. 1384, Pub date Aug. 1, 2001.*

Andre Kushniruk, "ITEC 3220—Using and Designing Database Systems," www.math.yorku.ca/~andrek/ITEC-3220/lecture-1.ppt, Indicated file creation date Dec. 23, 1996, p. 1-56.

* cited by examiner

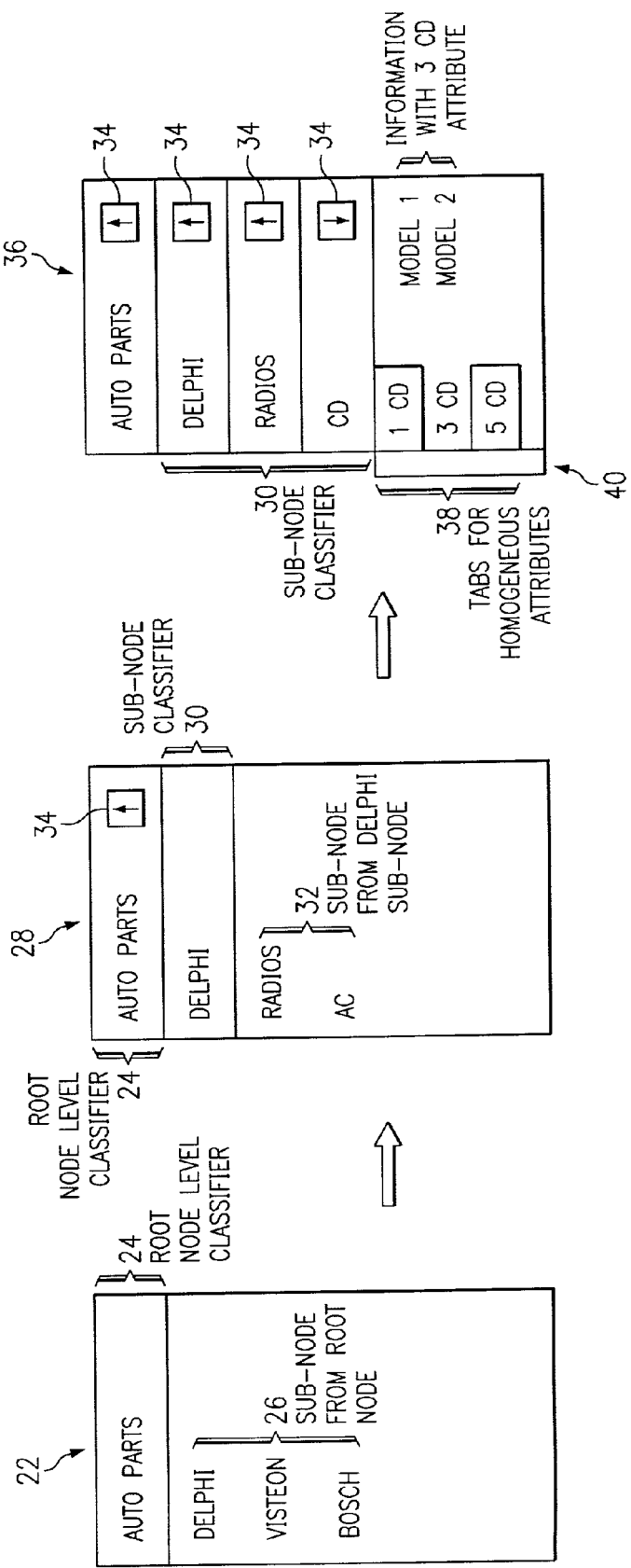

SYSTEM AND METHOD FOR PRESENTING INFORMATION ORGANIZED BY HIERARCHICAL LEVELS

TECHNICAL FIELD OF THE INVENTION

This invention relates in general to the field of computer user interfaces, and more particularly to a system and method for presenting information organized by hierarchical levels through a computer user interface.

BACKGROUND OF THE INVENTION

Modern computer systems are able to store, locate and present vast amounts of information to users in a short period of time. This ability to handle large quantities of information is both an advantage and a problem to computer users. The advantage is that computer systems save time and money by allowing businesses to track, update and use important information in a timely and efficient manner. The disadvantage is that users are easily overwhelmed by large and complex data structures, resulting in diminished productivity. In short, computer systems often have more information available for users than users are able to intelligently decipher through the user interface displayed by a computer system.

One example of a data structure that easily overwhelms users is a listing of automobile parts. Automobile parts are typically organized by a hierarchy of non-homogeneous classifiers to aid users in locating desired parts. For instance, a user seeking to locate and identify radios available from an inventory of auto parts might drill down through a hierarchical tree organization starting from a root node and traversing through descendant nodes that identify available parts by manufacturer and part type to reach a list of parts indexed by part attributes. Computer system user interfaces typically display such lists as trees, tree grids, or flat lists.

One difficulty with conventional displays of information organized by hierarchy levels is that users easily lose their presence of the state of the information displayed by a user interface. For instance, an example of a tree user interface is the display of a computer file directory by WINDOWS EXPLORER. A user expands the directory by clicking on plus signs and is able to view the entire directory by scrolling with a scroll bar to see portions of the directory unavailable for viewing due to the size of the directory compared with the size of the display. With large tree structures, users often lose their presence of the state of the information displayed as the root and path followed to the information of interest are hidden from view when the user scrolls down to view the information.

For instance, FIG. 1 depicts a display of information organized in a tree structure. A root node is the top-level of the tree structure and is the parent node of the lower level nodes of the tree structure. The tree structure organizes descendants of the root node by hierarchy levels. Nodes A, B, C and D are child nodes at a first level of the root node, and siblings of each other. Following the path from the root node to its child node B leads to nodes 1, 2 and 3, which are children nodes of B and grandchild descendants at the second level from the root node. The root node and node B are known as ancestor nodes of nodes 1, 2 and 3, with the root node and node B also referred to respectively as the grandparent and parent nodes of nodes 1, 2 and 3.

As is depicted by FIG. 1, when a tree structure is expanded so that children nodes are displayed, the amount of information displayed can quickly extend beyond the visible area of a computer display screen area. If a user scrolls through the screen to view information, this often removes substantial portions of the tree structure from the display of the user. Similarly, if the user collapses the tree structure, the children of the collapsed nodes are not available for view unless the node is expanded. Thus, for instance, if a user expands node C of FIG. 1, then node D extends beyond the view of a single screen and the user is not able to view the root node and node D in a single screen. If a user collapses node C, then node D becomes visible in a single screen.

Other types of conventional user interfaces are also ineffective at maintaining user awareness of the state of the hierarchical levels displayed. For instance, browser-based solutions allow a user to load pages associated with sub-nodes of a root directory but typically provide little information of the state presented to the user. Another example of a user interface is the folder list of MICROSOFT OUTLOOK 2000 which uses shortcut bars to activate options depicted as graphical icons. Clicking on a shortcut bar causes the window to shift to display options associated with the activated shortcut bar. However, the extent of the information available is limited since the shortcut bars only reposition, limiting the number of shortcut bars that may be presented in the display area.

SUMMARY OF THE INVENTION

In some embodiments of the present invention, a system and method include the capability to present information having a hierarchical organization in a manner that maintains a user's context of the state of the information presented. Information having hierarchy levels, such as a root node and sub-nodes that branch from the root node, is presented so that navigation bars related to the path of nodes from the root node to a desired sub-node are displayed while other sub-nodes are hidden from the user. Navigation of hierarchy levels with a strong presentation of state information is accomplished by activating navigation bars for a desired hierarchy level. The presentation of the state information is strong because the traversed path from the root node to the descendant node associated with the displayed information is shown directly without distraction by other nodes.

More specifically, in one embodiment, a computer system control supports presentation of information organized by hierarchy levels through a user interface with a stacking box metaphor. A root node navigation bar displays a root node label associated with the level of the hierarchy from which the sub-nodes descend. Activation of the root node navigation bar displays sub-node navigation bars stacked below the root node navigation bar so that a sub-node navigation bar for each sub-node of the next level of the hierarchy is displayed with an appropriate label. Activation of a sub-node navigation bar results in display of the root node navigation bar, the activated sub-node navigation bar and one of either the information associated with the activated sub-node navigation bar or additional sub-node navigation bars having the next hierarchy level relative to the activated sub-node navigation bar. Activation of the sub-node navigation bar results in hiding of unrelated sub-node navigation bars, such as siblings that are at the same level of the hierarchy as the activated sub-node navigation bar. In one embodiment, the computer system prefilters the data nodes to reduce unrelated sub-nodes before the information is passed to the control for presentation by the user interface.

In one embodiment, when a user drills down through the hierarchy to a sub-node that contains information, the information is displayed below the stack of the root node and relevant sub-nodes, such as in a related window. The stack of navigation bars from the root node to the sub-node having the lowest selected hierarchy level presents an uncluttered view of the state of the displayed information with the navigation bar labels showing the path to the displayed information without the siblings of sub-nodes of the path. In one embodiment, each navigation bar presents a non-homogeneous classifier of the displayed information and index tabs further classify the information based on homogeneous attributes. Upon activation of a sub-node having information with homogeneous attributes, index tabs associated with one or more attributes are presented so that activation of an index tab presents information associated with the attribute of the activated tab and hides information not associated with the attribute of the activated tab.

The user interface's use of a stacked box metaphor provides a strong presentation of state information, reducing the difficulty that often otherwise arises when a user attempts to place in context a portion of displayed information relative to un-displayed information. A user is able to view information associated with a level of the hierarchy organization with the current location in the hierarchy continuously displayed as a stack at the top of the user interface and other nonrelevant state information hidden to reduce confusion. The strong presentation of state information provides a significant advantage over conventional tree displays since, in conventional tree displays, scrolling down to the information desired often removes the full context or a substantial context of state information from the tree user interface. In contrast, in one embodiment, the stacked box metaphor maintains presentation of state information for displayed data, even while a user scrolls through the data.

The index tabs associated with information displayed below a stacked box metaphor allows presentation of a strong separation of non-homogeneous hierarchy classifiers from indexed homogeneous attributes of the information. The user interface separates hierarchy levels and information indexing by presenting hierarchy levels with navigation bars and presenting indexes with tabs to represent indices according to, for example, one or more attributes. This advantageously avoids user confusion which may result when classifiers and indexes are represented in the same manner, such as nodes of a tree.

The stacked box metaphor reduces the need for scrolling through information, thus improving the scanability of the user interface by, for instance, presenting only state information relevant to the data being viewed. A user who has drilled through sub-nodes to a desired hierarchy level to view information associated with that level has only relevant nodes of the hierarchy levels displayed, such as the nodes of the traversed path, while irrelevant nodes are hidden, such as the sibling nodes of the selected node and the sibling nodes of the ancestors of the selected node. Thus any necessary scrolling is at the level of information, simplifying the presentation of the information and its state. Further, a user may easily navigate to different levels of the hierarchy while maintaining strong state information by activating a root or sub-node navigation bar of the traversed path to display that level of the hierarchy and related relevant levels while hiding levels irrelevant to the selected information.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 3 depicts user interfaces to represent the information depicted by FIG. 2.

DETAILED DESCRIPTION OF THE INVENTION

Figure 1:
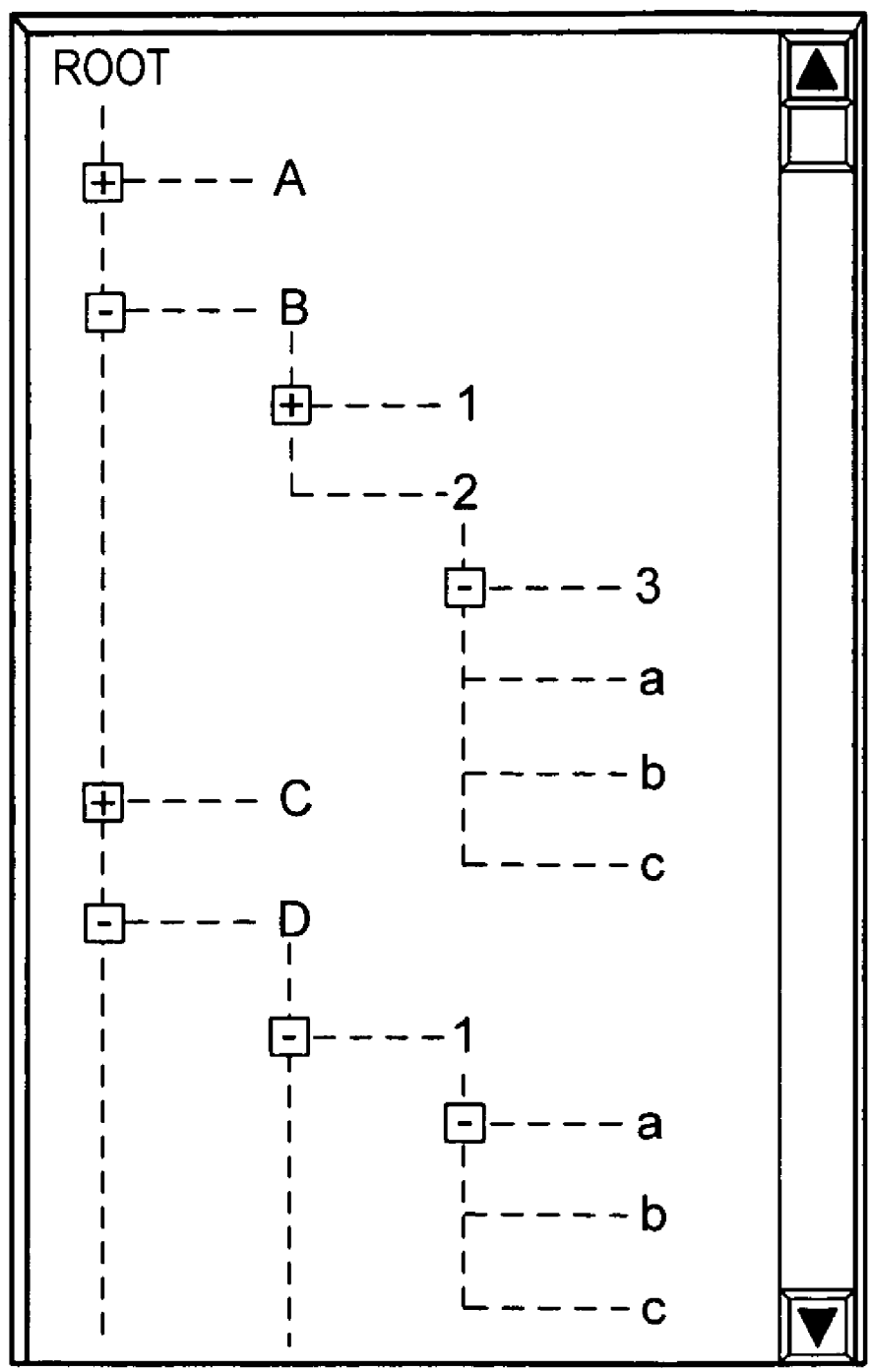
FIG. 1 depicts a prior art display of information organized as a tree.

Embodiments of the present invention are illustrated in the figures, like numerals being used to refer to like and corresponding parts of the various drawings. Many embodiments of the present invention have application to a wide range of industries including the following: computer hardware and software manufacturing and sales, professional services, financial services, automotive sales and manufacturing, telecommunications sales and manufacturing, medical and pharmaceutical sales and, manufacturing and construction industries.

Computer systems are important tools for storing, editing and maintaining detailed information in a wide range of industries. However, even the most capable computer system is of limited practical use if the information it contains is not readily accessible to end users in an efficient and user-friendly manner. As the quantity and complexity of data structures increases, the need for easily understood user interfaces that have a high capability to provide a frame of reference for the context of displayed information grows accordingly. In particular, with complex data ordered by hierarchy levels, a user interface is needed that presents strong state information so that users readily understand and navigate levels of the hierarchy with reduced effort and time.

An example of an application that involves complex hierarchy levels and large quantities of data is the editing and maintenance of automobile part codes. Automobile part codes are generally arranged by classifiers, such as part type, part family, and subfamily, and then further organized at classified levels by one or more indexed attributes, such as alphabetically by name or numerically by part number. Users select and edit auto part codes by finding the code information at the appropriate level of the hierarchy.

Some embodiments of the present invention allow users to quickly navigate both hierarchy levels and index attributes to find and manipulate auto part codes. The user interface depicts a stacking box metaphor that allows users to navigate relevant portions of the hierarchy while maintaining strong state information and also uses address book style tabs to allow users to quickly traverse indexed attributes. Strong state information is maintained by hiding from the user levels of the hierarchy that are not relevant to the user's navigation, such as siblings of sub-nodes on the path between the root node and the activated sub-node having the lowest hierarchy level. Although auto parts provide one example of information typically organized by hierarchy levels, the user interface is readily adapted to present any data that is organized by hierarchy levels and to index data where sub-levels in the hierarchy have a nominally valued attribute available to build an index between sublevels. Further, a user may change the state of the hierarchy level by activating a sub-node to view the state of information associated at the hierarchy level of the activated sub-node, thus reducing the complexity of navigation through the hierarchy levels of the tree.

Figure 2:
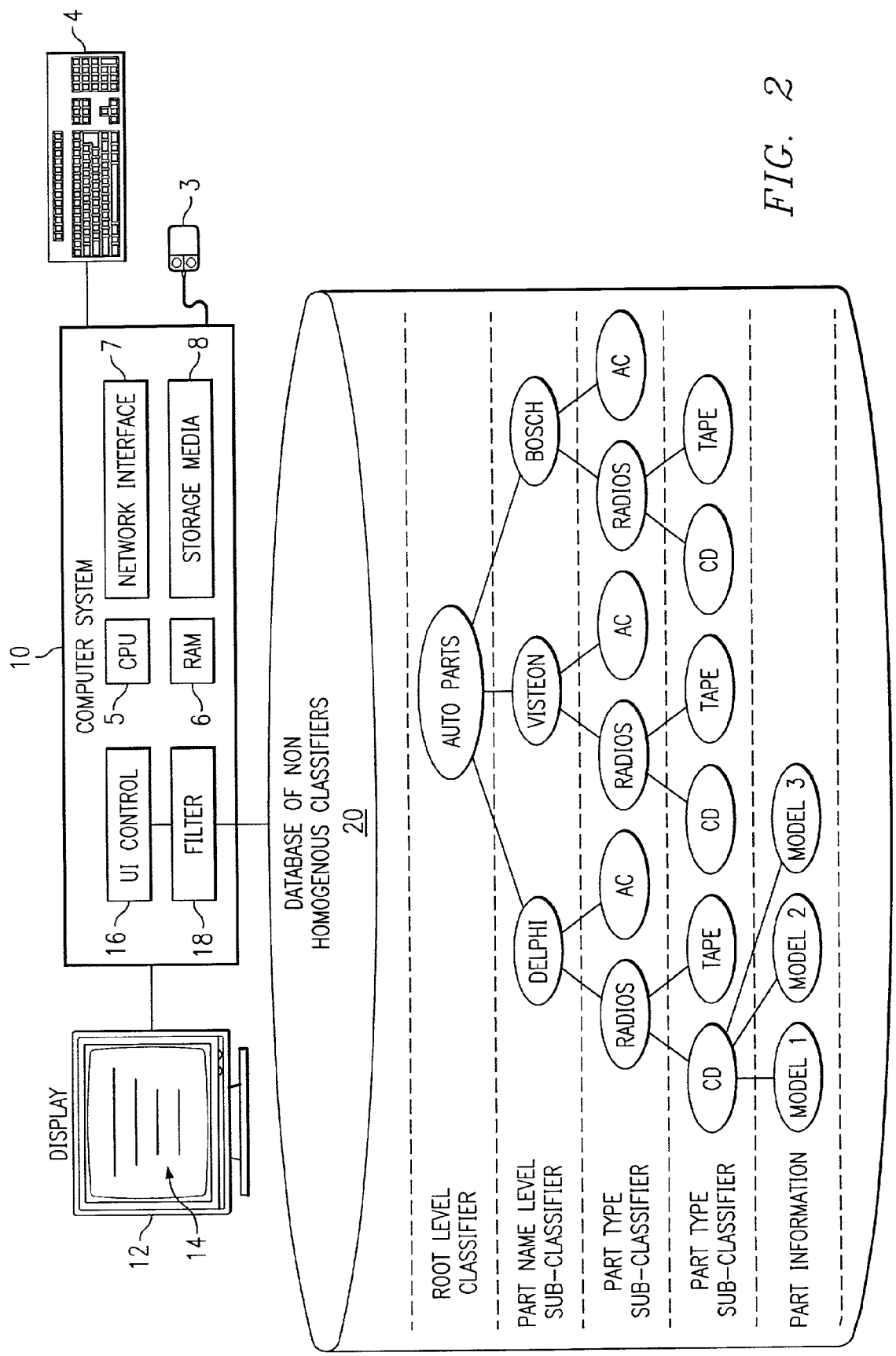
FIG. 2 depicts a block diagram of a computer system interfaced with a database of information organized as a tree structure.

Referring now to FIG. 2, one embodiment is illustrated by a computer system 10 communicating with a display 12 that displays a user interface 14. A user interacts with computer system 10 through conventional I/O devices, such as mouse 3 and keyboard 4, to select instructions for operation by a CPU 5 in cooperation with local memory, such as RAM 6. A network interface 7 enables communication with other computer systems and storage devices through conventional networks, such as the Internet, a LAN and a WAN. A local storage media 8 stores computer program instructions to operate the user interface and includes such storage devices as hard disks, CD-ROM drives, magneto-optical drives and peripheral memory devices. For instance, computer system 10 is a conventional personal computer with a 32-bit microprocessor CPU 5 that loads instructions from a remote media, such as a CD or network site, onto storage media 8 and runs the instructions with the aid of RAM 6. Computer system 10 described above is for purposes of example only and may be implemented in any type of computer system or programming or processing environment.

Computer system 10 includes a user interface control 16, which controls the display of user interface 14, and a filter 18 that provides data to user interface control 16 for display by user interface 14. Computer system 10 supports user interface control 16 on any number of platforms, such as Windows, Java or an Internet browser, and with any number of GUI layers, such as Win32, JavaSwing, DHTML. User interface control 16 presents user interface 14 based on event and GUI libraries for the selected platform. Filter 18 prefilters data to limit the levels of the hierarchy provided to user interface control 16, thus trimming the data before providing it to user interface control 16.

Database 20 stores data by a hierarchy of non-homogeneous classifiers. For instance, a root level classifier of auto parts is displayed as the root node of a data tree. The next lowest level subclassifier is the manufacturer of auto parts, depicted in the tree of database 20 as a "Delphi," sub-node, a "Visteon" sub-node and a "Bosch" sub-node. Each manufacturer sub-node has part type subclassifier hierarchy levels in descending order of hierarchy levels depicted as sub-nodes from the respective manufacturer's sub-node. For instance, the Delphi sub-node has radio and AC sub-nodes at the next lower hierarchy level, and the radio sub-node has CD and tape sub-nodes at its next lower hierarchy level. From the lowest hierarchy level for a path from the root level, such as CD players, part information is indexed. Thus, to find part information for a CD player model 1, a user drills down through the auto parts, Delphi, radios and CD classifier hierarchy levels. The data is thus organized by a model suitable to the use of the data and the nature of the data so that users are able to find information in a logical manner. User interface control 16 applies the data model, data nature, structure of the hierarchy and indexable attributes to generate user interface 14 for display of desired information selected by the navigation of a user.

Referring now to FIGS. 2 and 3, three examples of user interfaces 14 are depicted for displaying the information of database 20. An initial user interface 22 displays a root node level classifier navigation bar 24 with the label "auto parts." Sub-node manufacturer labels 26 are stacked below the root node label to visually indicate the next lower hierarchy level from the selected root hierarchy level that the user may navigate. A single click on a node or sub-node label displays details on the selected node within the hierarchy. A double click on a sub-node initiates navigation of the next hierarchy level from that sub-node. For instance, a double click on the Delphi label of user interface 22 results in display of user interface 28.

In user interface 28, a Delphi sub-node navigation bar 30 is displayed upon activation of the Delphi label sub-node 26 of user interface 22. Upon activation of the Delphi sub-node label 26, a sub-node navigation bar 30 with the Delphi label is presented in user interface 28 along with sub-node labels 32 for sub-nodes of the next lower hierarchy level from the activated hierarchy level, such as radios and AC. User interface 28 hides sub-nodes that are not relevant to a search for information under the Delphi node of the tree, i.e., the siblings of the activated Delphi node. Thus, the Visteon and Bosch labels are not depicted by user interface 28. However, an activation icon 34 is presented in the root node navigation bar 24 so that a user navigating upwards in the tree from the Delphi sub-node 30 may activate icon 34 to return to user interface 22 and display the sub-nodes 26 from the auto parts root node 24.

User interface 36 depicts the display that results from drilling down through the Delphi, radios and CD sub-nodes 30 to show model information for CDs. As illustrated by user interface 36, only the levels of the hierarchy that aid an understanding of the state are displayed, i.e., the manufacturers other than Delphi, the parts other than radios, and the parts other than CDs hidden from view so that the traversed path from the root node to the CD node is apparent without displaying the sibilings of the nodes between the root node and the activated CD node. Each navigation bar has an activation icon 34 so that a user may navigate to any level of the hierarchy by activating the icon 34 associated with the navigation bar of the level of the hierarchy of interest. Upon activation of an icon 34, user interface 14 displays the nodes of the traversed path from the root node to the node associated with the activated icon, hides the siblings of the displayed nodes, and displays either the sub-nodes that are children of the activated node or the information associated with the activated node.

At the bottom of the navigation bar stack, information associated with the lowest level sub-node, in this example the CD sub-node, is displayed according to index tabs 38. For example, the CD information is indexed according to the number of CD disks handled by each model. User interface 36 illustrates that models 1 and 2 are indexed to have 3 CDs and that a user may activate a 1 CD index tab or a 5 CD index tab to display models having those attributes. The indexed homogeneous items respectively represent a heterogeneous section of parts sliced across the attribute of the number of CD disks handled by the CD player.

A scroll bar 40 allows a user to scroll through the list of CD models if the list of models extends beyond the viewing space. During scrolling to view models, the user maintains a strong presence of state information since the navigation bars continue to display the levels of the hierarchy being navigated while hiding the display of nodes not relevant to the traversed path. This limited scrolling preserves strong scanability with the index tabs presented in order along the scroll bar to aid a user in finding a desired bucket of information once at the appropriate sub-node level of the hierarchy.

The presentation of user interfaces by the user interface control 16 may be implemented in a number of ways, including the use of DMHL objects with extensible mark up language (XML) island trees that allow preloading of data to limit screen refreshes in a web based environment. Alternatively, page loads or other conventional techniques may be used. The user interface may take advantage of different types of tree structures for a given data set to optimize presentation of data for desired applications. The selected data structure may take advantage of a separation of non-homogeneous classifiers for hierarchy levels and homogeneous indexing for information to represent information in an understandable fashion.

Although embodiments of the present invention have been described in detail, it should be understood that various changes, substitutions and alterations can be made hereto without departing from the spirit and scope of the invention as defined by the appended claims.

What is claimed is:

1. A user interface for displaying database classifiers organized with multiple hierarchy levels, the user interface comprising:
   a root node navigation bar representing a root hierarchy level of the multiple hierarchy levels; and
   multiple sub-node navigation bars oriented from the root node navigation bar, each sub-node navigation bar representing a sub-node from a selected level of the multiple hierarchy levels, wherein multiple sub-nodes represent database classifiers of database objects and a plurality of sub-nodes in the multiple hierarchy levels represent the same database classifier label having associated indexed, homogenous attributes of parts and each indexed, homogenous attribute represents a heterogeneous section of the parts sliced across the attributes of the parts;
   wherein the sub-node navigation bars display sub-nodes on a path from the root hierarchy level to the one or more sub-nodes having the lowest selected hierarchy level, wherein the user interface hides siblings of the displayed sub-nodes for the hierarchy levels between the root level and the hierarchy level of the one or more sub-nodes having the lowest selected hierarchy level, and each displayed sub-node represents a distinct classifier in the path.

2. The user interface of claim 1 further comprising:
   information associated with a sub-node, the sub-node having the lowest selected hierarchy level.

3. The user interface of claim 2 wherein the hierarchy levels represent non-homogeneous classifiers of the information and wherein the information associated with the sub-node having the lowest selected hierarchy level has one or more homogeneous attributes, the user interface further comprising one or more tabs associated with the one or more attributes of the information, each tab operable to select display of information having an attribute associated with the tab.

4. The user interface of claim 1 wherein one or more of the navigation bars is operable to select display of labels for nodes from the root node to sub-nodes having a hierarchy level one level lower than the node associated with the selected navigation bar.

5. The user interface of claim 1 implemented with one of Win32, JavaSwing or DHTML.

6. The user interface of claim 1 presented through a browser.

7. The user interface of claim 6 wherein the browser is populated using XML data islands.

8. The user interface of claim 1 further comprising an activation icon associated with a navigation bar, the activation icon operable to display the hierarchy level associated with the sub-node of the navigation bar.

9. The system of claim 8 wherein the activation icon is further operable to display sub-nodes of the activated icon.

10. The system of claim 8 wherein the activation icon is further operable to hide sibling nodes of the activated icon.

11. A method for presenting database classifiers organized by hierarchy levels, the method comprising:
    displaying a first hierarchy level having a first hierarchy database classifier label;
    displaying a second hierarchy level having multiple second hierarchy database classifier labels;
    activating one of the second hierarchy database classifier labels;
    displaying information associated with the activated database classifier label or, if available, a third hierarchy level having multiple third hierarchy database classifier labels; and
    hiding display of the unactivated second hierarchy database classifier labels;
    wherein multiple database classifier labels represent database objects and a plurality of database classifier labels in multiple hierarchy branches are the same database classifier label having associated indexed, homogenous attributes of parts and each indexed, homogenous attribute represents a heterogeneous section of the parts sliced across the attributes of the parts and each displayed classifier label is displayed only once in each displayed hierarchy.

12. The method of claim 11 wherein activation of the second hierarchy label displays information associated with the activated label, the information indexed according to one or more attributes, the method further comprising:
    displaying multiple index tabs proximate to the information, each index tab associated with one or more of the attributes;
    activating one of the multiple index tabs; and
    displaying the information associated with the one or more attributes of the activated index tab.

13. The method of claim 12 wherein one or more of the displayed hierarchy levels are stacked as navigation bars in order from a root level to a lowest hierarchy level.

14. The method of claim 13 wherein the displayed information is stacked below the lowest hierarchy level.

15. The method of claim 12 further comprising:
    displaying an activation icon;
    activating the activation icon;
    removing the multiple third hierarchy labels; and
    displaying the multiple second hierarchy labels.

16. The method of claim 11 wherein activation of the second hierarchy label displays the third hierarchy level having multiple third hierarchy labels, the method further comprising:
    displaying an activation icon associated with the first hierarchy label, the activation icon operable to remove the multiple third hierarchy labels and to display the multiple second hierarchy labels.

17. The method of claim 11 wherein the hierarchy levels are displayed as a stacked box metaphor.

18. A computer system comprising:
    a database having information classified by non-homogeneous classifiers organized as a root node and multiple sub-nodes;
    a display operable to present a user interface;
    a control interfaced with the database and the display, the control operable to generate a user interface for presentation on the display, the user interface having the root node and predetermined sub-nodes stacked from highest to lowest hierarchy levels, the user interface further operable to hide predetermined sub-nodes that are not relevant to the sub-node having the lowest hierarchy level, wherein multiple sub-nodes represent database classifiers of database objects, and a plurality of sub-nodes in the multiple hierarchy levels are the same database classifier label having associated indexed, homogenous attributes of parts and each indexed, homogenous attribute represents a heterogeneous section of the parts sliced across the attributes of the parts, and each displayed sub-node represents a distinct classifier.

19. The computer system of claim 18, the user interface further having predetermined information stacked below the sub-node having the lowest hierarchy level, the predetermined information associated with the sub-node having the lowest hierarchy level.

20. The computer system of claim 19 wherein the information is further indexed by an attribute, the user interface further having multiple index tabs associated with the information and operable to display information having the attribute.

21. The computer system of claim 20, the user interface further having a scroll bar associated with the information and operable to scroll through the information without affecting the presentation of the stacked nodes.

22. A program product for displaying hierarchy levels of database classifiers that organize the database classifiers with multiple nodes, the program product comprising:
a storage medium that stores computer readable instructions; and
instructions stored on the storage medium, the instructions operable to command a computer to display selected nodes from first, second or third hierarchy levels, the instructions selecting for display the nodes of the first and second hierarchy levels display only the nodes of the first and second hierarchy levels on a traversed path to the third hierarchy level, wherein multiple nodes represent database classifiers of database objects, a plurality of nodes in the hierarchy levels represent the same database classifier label having associated indexed, homogenous attributes of parts and each indexed, homogenous attribute represents a heterogeneous section of the parts sliced across the attributes of the parts, and each displayed node represents a distinct classifier.

23. The program product of claim 22 wherein the first hierarchy level comprises the root node.

24. The program product of claim 22 wherein the second hierarchy level comprises multiple nodes, the instructions commanding the computer to display the one of the multiple nodes of the second hierarchy level on the traversed path to the third hierarchy level and to hide the sibling nodes of the displayed node.

25. The program product of claim 22 wherein the third hierarchy level comprises information associated with a selected one of the nodes of the second hierarchy level.

26. The program product of claim 25 further comprising multiple indices that organize the information of the third hierarchy level according to one or more attributes.

27. The program product of claim 22 wherein the third hierarchy level comprises multiple nodes, the instructions further operable to accept a selection of one of the multiple nodes of the third hierarchy level and to hide the sibling nodes of the selected third hierarchy level node.

28. An electronic display of database classifiers organized with multiple hierarchy levels, the electronic display comprising:

a visual representation of a tree data structure having a root node and multiple descendant nodes; and
a visual representation of an index of data associated with a selected descendant node;
wherein the visual representation of the tree data structure displays the descendant nodes on the traversed path from the root node to the selected descendant node and conceals siblings of the descendant nodes on the traversed path; and
wherein multiple descendant nodes represent database classifiers of database objects, a plurality of descendant nodes in the multiple hierarchy levels represent the same database classifier label having associated indexed, homogenous attributes of parts and each indexed, homogenous attribute represents a heterogeneous section of the parts sliced across the attributes of the parts, and each displayed node represents a distinct classifier.

29. The electronic display of claim 28 wherein the descendant nodes on the traversed path are selectable to display child nodes of the selected node.

30. The electronic display of claim 28 wherein the descendant nodes on the traversed path are selectable to display sibling nodes of the selected node.

31. The electronic display of claim 28 wherein the index comprises a visual representation of data.

32. The electronic display of claim 31 wherein the data nodes represent non-homogeneous classifiers and the index represents a homogeneous attribute.

33. The electronic display of claim 31 wherein the data is organized according to one or more attributes.

34. The electronic display of claim 33 wherein the data is represented by tabs associated with the one or more attributes.

35. The electronic display of claim 34 wherein selection of a tab displays data associated with the tab and conceals other data associated with the selected descendant node.

36. The electronic display of claim 28 wherein the root node and descendent nodes are stacked in hierarchy level order.

37. A combination tree data structure and index capable of electronic visual display of database classifiers organized by hierarchy levels, the combination tree data structure and index comprising:
a tree data structure having one or more nodes associated with each hierarchy level; and
an index of selected information associated with a selected one of the nodes, the index having a plurality of indices, each of the plurality of indices capable of displaying predetermined parts of the selected information,
wherein the siblings of the selected node and the siblings of ancestors of the elected node are not displayed; and
wherein multiple sibling nodes represent database classifiers of database objects, a plurality of sibling nodes in the hierarchy levels represent the same database classifier label having associated indexed, homogenous attributes of parts and each indexed, homogenous attribute represents a heterogeneous section of the parts sliced across the attributes of the parts, and the selected node, the ancestors of the selected node, and any children of the selected node represent distinct classifiers.

38. The combination tree data structure and index of claim 37 wherein each indice is represented by a tab.

39. The combination tree data structure and index of claim 37 wherein the hierarchy levels correspond to non-homogeneous classifiers of the information.

40. The combination tree data structure and index of claim 37 wherein the indices correspond to one or more homogeneous attributes of the information.

41. A method of electronically displaying database classifiers organized by hierarchy levels, the method comprising:

displaying a tree structure having a plurality of nodes representing database classifiers;

selecting a node;

displaying the tree structure with only the selected node and the direct ancestors of the selected node, wherein the displayed tree structure represents distinct database classifiers; and displaying an index associated with the selected node, the index having a plurality of indices, each of the plurality of indices having associated information representing a database object;

wherein multiple sibling nodes represent database classifiers of database objects, a plurality of sibling nodes in the hierarchy levels represent the same database classifier label having associated indexed, homogenous attributes of parts and each indexed, homogenous attribute represents a heterogeneous section of the parts sliced across the attributes of the parts.

42. The method of claim 41 further comprising:

displaying the tree structure with only the selected node and the direct ancestors of the selected node.

43. The method of claim 42 wherein the tree structure is displayed as a stacked box metaphor.

44. The method of claim 43 further comprising:

collapsing a node of the stacked box metaphor; and displaying the tree structure with the collapsed node, the children of the collapsed node and the direct ancestors of the collapsed node.

45. The method of claim 41 wherein the nodes represent non-homogeneous classifiers and the index represents homogeneous attributes.

* * * * *